United States Patent [19]

Astle et al.

[11] Patent Number: 4,827,344

[45] Date of Patent: May 2, 1989

[54] APPARATUS FOR INSERTING PART OF ONE VIDEO IMAGE INTO ANOTHER VIDEO IMAGE

[75] Inventors: Brian Astle, Cranbury; Gerald D. Ripley, Lawrenceville, both of N.J.

[73] Assignee: Intel Corporation, Santa Clara, Calif.

[21] Appl. No.: 913,586

[22] Filed: Sep. 30, 1986

Related U.S. Application Data

[63] Continuation of Ser. No. 707,044, Feb. 28, 1985, abandoned.

[51] Int. Cl.$^4$ .............................................. H04N 5/272
[52] U.S. Cl. ...................................... 358/183; 358/22; 358/182
[58] Field of Search .................. 358/182, 183, 22, 185

[56] References Cited

U.S. PATENT DOCUMENTS

| | | | |
|---|---|---|---|
| 3,619,495 | 11/1971 | Ito et al. | 358/183 |
| 3,832,485 | 8/1974 | Pieters | 178/6.8 |
| 3,941,925 | 3/1976 | Busch et al. | 358/183 |
| 3,989,888 | 11/1976 | Busch et al. | 358/182 |
| 4,199,788 | 8/1980 | Tsujimura | 358/183 |
| 4,356,511 | 10/1982 | Tsujimura | 358/181 |
| 4,358,788 | 11/1982 | Burrowes | 358/22 |
| 4,392,156 | 7/1983 | Duca | 358/183 |
| 4,432,016 | 2/1984 | Shanley, II | 358/183 |
| 4,488,169 | 12/1984 | Yamamoto | 358/22 |
| 4,602,286 | 7/1986 | Kellar | 358/183 |

FOREIGN PATENT DOCUMENTS

| | | |
|---|---|---|
| 2238715 | 11/1982 | Fed. Rep. of Germany . |
| 1131539 | 10/1968 | United Kingdom . |
| 1526671 | 9/1978 | United Kingdom . |
| 2032217 | 4/1980 | United Kingdom . |
| 2048612 | 12/1980 | United Kingdom . |
| 1605135 | 1/1982 | United Kingdom . |
| 2096858 | 10/1982 | United Kingdom . |
| 2113950 | 8/1983 | United Kingdom . |
| 21130838 | 6/1984 | United Kingdom . |

OTHER PUBLICATIONS

"Computer Software for Graphics," *Scientific American*, Sep. 1984, at page 150 Top of Right Most Column Briefly Mentions Varying Pixel Intensity to Minimize Aliasing.

*Primary Examiner*—Tommy P. Chin
*Attorney, Agent, or Firm*—E. P. Herrmann; J. S. Tripoli

[57] ABSTRACT

Computer generated video objects may be superimposed over a background video image so as to create the illusion of a single composite scene. The leading edge of an object is detected and for a period of time the object and background video signals are mixed. After that period, only the object video is transmitted. Upon detection of the object's trailing edge, the two video signals are again mixed for a period of time. After this latter period, only the background video signal is transmitted until another object's edge is detected.

11 Claims, 3 Drawing Sheets

APPARATUS FOR INSERTING PART OF ONE VIDEO IMAGE INTO ANOTHER VIDEO IMAGE

This is a continuation of application Ser. No. 707,044, filed 28 Feb. 1985 now abandoned.

The present invention relates to superimposing portions of one video image over another image in a display and particularly to such superimposition for computer controlled video displays.

BACKGROUND OF THE INVENTION

Computers often generate video images, such as for games or graphical displays, by storing a single image in memory which represents a background scene in which various foreground objects appear. For example, the background may be outer space with stars and planets and the foreground may be a series of objects such as space ships and meteors which move across space. More sophisticated computer displays use two video signals separately representing the background scene and the foreground objects. The background video may be computer generated, e.g. derived from images stored in one part of the computer's memory, produced by playback of scenes stored on a video disk, or generated from a data source. The foreground objects or "sprites" typically are independently generated by the computer and stored in another part of the memory.

The overlay of the foreground video objects is accomplished by switching between the two video sources so as to replace portions of the background image with the foreground objects. Techniques similar to this have been used in television broadcasting to key or insert titles into a picture. However, this process tends to produce sharp edge transitions between the foreground object and the background scene, which often results in an unnatural appearing composite image, i.e. the foreground objects stand out from the background rather than blending into it.

This unnatural appearance is aggravated further by the finite size of the picture elements (pixels) used to form the objects in the computer generated foreground image. The finite pixel size often results in curved or diagonal edges of objects appearing jagged, an effect commonly referred to as aliasing. These jagged edges also contribute to the appearance of the foreground object standing out from the background and thus rendering the final composite image less natural in appearance.

SUMMARY OF THE INVENTION

A video signal processor includes a means for detecting the edges of an object in a first video signal. An apparatus is provided which inserts said object in the first video signal over an image in a second video signal. The superimposition apparatus includes means for mixing the two video signals for a period of time upon the detection of the edge.

DETAILED DESCRIPTION OF THE PREFERRED EMBODIMENT

Figure 1:
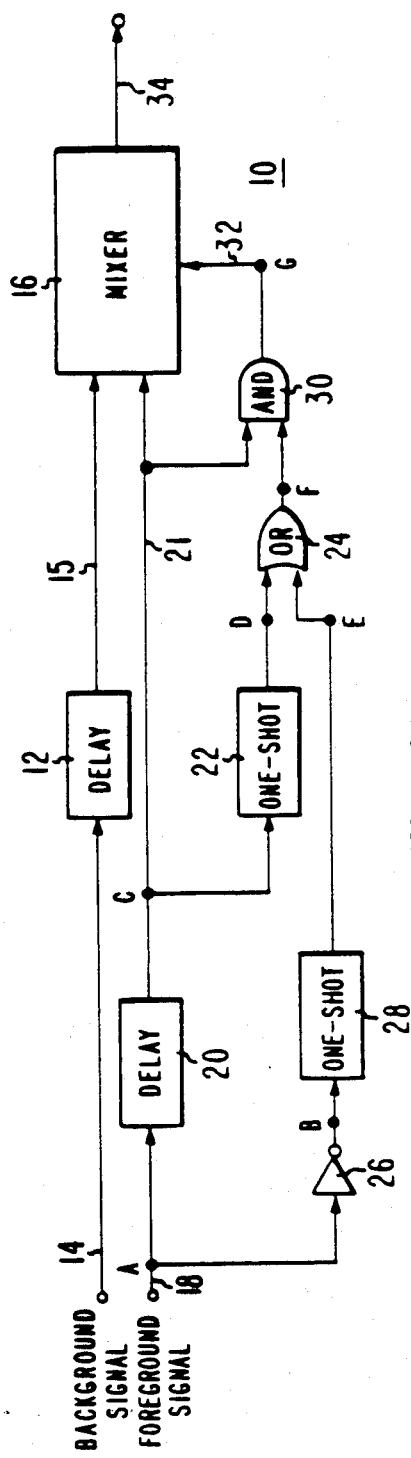
FIG. 1 is a schematic circuit diagram of the present invention.

An apparatus 10 for superimposing portions of a foreground video signal over a background video signal is shown in FIG. 1. The apparatus typically may be incorporated in a computer for displaying video games or graphics but also has applications in analog video signal systems including broadcast television. The background signal represents a background image of the game or graphic display. The foreground video contains representations of various objects or patterns which are to be superimposed over the background video image to form a composite image.

The term "object" as used herein refers to that portion of the foreground video signal representing the pattern to be superimposed. The terms "object edge" and "edge of the object" mean those portions of the foreground video signal representing the outer edge of the object as opposed to edges of detail within the object. The term "video", as used throughout the present application and claims, refers to any image signal; for example, a conventional video signal or a conventional signal without the reference components (e.g. horizontal and vertical sync pulses, color burst, etc.). In the latter instance, the reference component signals are added to the image signal after operation of the superimposition apparatus 10.

As used herein the term "superimpose" means to insert part of one video image into another video image so that the inserted part replaces the corresponding part of the other video image.

Figure 4:
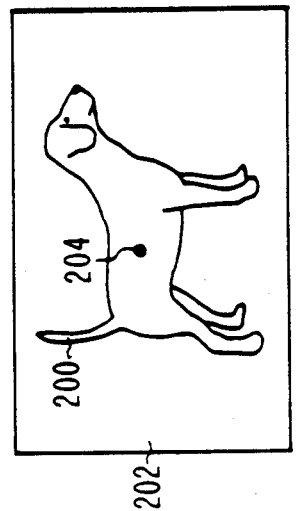
FIG. 4 is a representation of a foreground video image containing an image of a dog.

As shown in FIG. 4, the foreground video contains an object 200, such as a dog, surrounded by an area 202. In the composite output image, the surrounding area 202 will be replaced by the background video. An alternative way of looking at the composite is that the surrounding area 202 is transparent when the foreground video is superimposed over the background video image. The dog 200 may contain various details such as a mouth, eyes and a black spot 204.

In order to be able to distinguish the edges between the surrounding area 202 and the object 200, from interior edges of object detail such as spot 204, the surrounding area 202 is represented by a blacker-than-black video signal level. For example, if reference black is represented by zero volts and white by one volt, the object surrounding area 202 could have a signal level of $-0.5$ volts. Various other luminance levels or colors are represented by voltages between zero and one volt.

Although the above foreground video signal scheme will be used throughout this description, the present invention may be used with a less sophisticated foreground video scheme. Where the object 200 does not contain any detail, a simple two state video foreground signal may be used, where the object is one video state and the surrounding area is the other state. Detection of the object edges is accomplished by looking for transitions between the two states.

The apparatus 10 comprises a first delay circuit 12 to which the background video signal is supplied on line 14. The first circuit 12 delays the background signal by one-half a picture element (pixel) period, for example. The output of the first delay circuit 12 is fed via line 15 to one video input of a video mixer 16.

The foreground image video signal on line 18, which is substantially in synchronism with the background video signal, is coupled to the input of a second delay circuit 20 to provide a delay to the foreground signal equal to that of the background signal delay. The delayed foreground image signal is fed via line 21 from the second delay circuit 20 to another input of video mixer 16, to AND gate 30, and, to the input of a first monostable multivibrator or one-shot 22. The first one-shot 22 emits a pulse having a length $T_1$ upon detecting a positive going transition in the input video from blacker-than-black to black (or lighter than black). The output pulse from the first one-shot 22 is coupled to one input of an OR gate 24.

The foreground image signal is also inverted by inverter 26 and then fed to a second one-shot 28. The second one-shot 28 emits a pulse having a length $T_2$ upon the detection of a positive going edge in the inverted foreground video signal corresponding to a transition from black (or lighter than black) to blacker-than-black. The pulse length $T_2$ of the second one-shot 28 is slightly longer than the length $T_1$ of the first one-shot's pulse by one-half of a pixel period, for example. The output of the second one-shot 28 is coupled to the other input of OR gate 24. The output of the OR gate 24 is connected to the other input of the AND gate 30, the output of which is coupled to the mode control input 32 of the mixer 16.

The superimposition apparatus 10 of FIG. 1 may be part of a computerized video game or graphics display in which the background video image is supplied on line 14 and the foreground video objects are supplied in a video image signal on line 18. The apparatus 10 combines the two signals into a single image signal on output line 34 in which the objects in the foreground video image are placed over and blended into the background image.

Figure 2A:
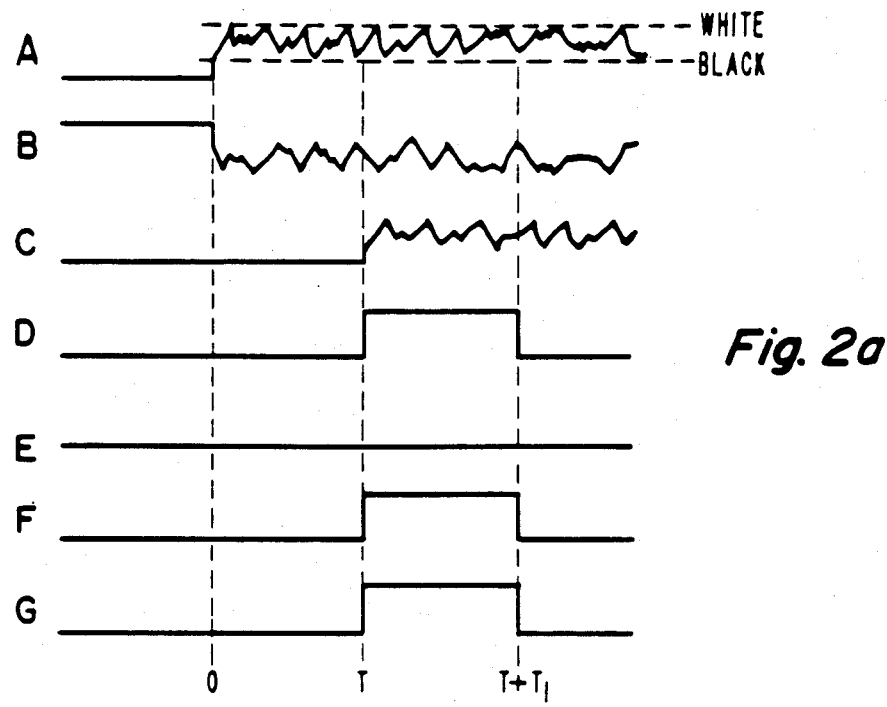
FIGS. 2a and 2b are sets of waveform diagrams of the signals at selected modes of the circuit in FIG. 1.

The operation of the superimposition apparatus 10 can best be understood with reference to the voltage waveform diagrams of FIGS. 2a and b. The letters opposite the various waveforms in FIGS. 2a and 2b identify the nodes in FIG. 1 at which the waveforms appear.

FIG. 2a depicts the waveforms generated when a signal transition representing the leading edge of an object is detected in the foreground video signal. Up until time zero the foreground video signal is at a low level, blacker-than-black for example, and only the background video image is transmitted by mixer 16 on line 34.

At time zero, the object edge, represented by a transition up to at least the black level, is present in the foreground video on line 18 as shown on waveform A. This signal is inverted by inverter 26 (waveform B) and because the inverted edge is a negative going signal, the second one-shot 28 does not trigger as shown in waveform E.

The foreground image signal is delayed for a period T by the second delay circuit 20 as depicted in waveform C. At time T, the positive going signal of the object edge in the delayed signal triggers the first one-shot 22 producing a pulse from time T to $T+T_1$ (waveform D). As the output of the second one-shot 28 is low, the pulse from the first one-shot 22 is transmitted through OR gate 24 to AND gate 30.

As long as the pulse from the first one-shot 22 and the signal representing the object in the foreground image are both present at the AND gate inputs, the AND gate 30 will send a "high" logic level to the mode control input 32 of the mixer 16 (waveform G). The threshold level of the AND gate 30 for the video input is set to slightly less than reference black. This high level instructs the mixer to produce an output on line 34 which is a mixture or blend of the background and foreground images, both of which have been equally delayed by the first and second delay circuits 12 and 20.

At time $T+T_1$ the pulse from the first one shot 22 ends (waveform D) and although the object is still present in the foreground video, AND gate 30 supplies a low logic level to the mode control of mixer 16 (waveform G). The blending of the two video signals ceases and as will be described in detail later, only the foreground video is transmitted by the mixer 16.

Figure 2B:
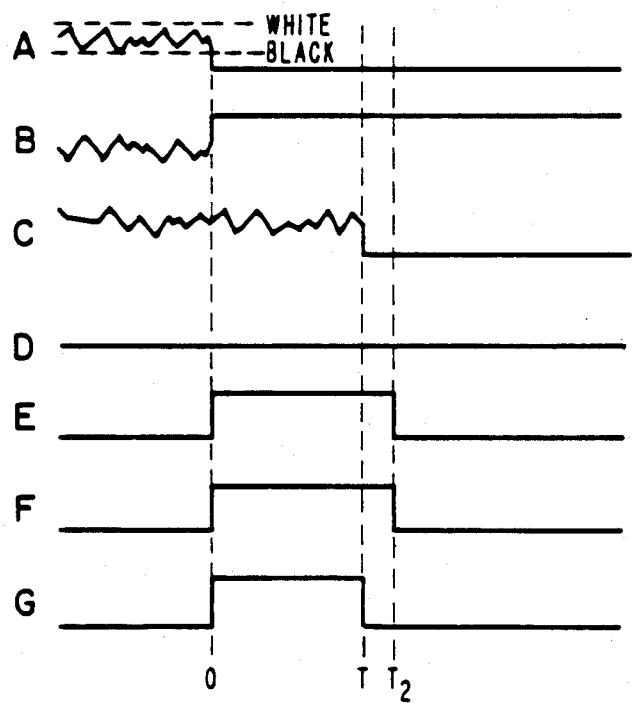

The transmission of only the foreground object video continues until its trailing edge is detected as shown in FIG. 2b. At time zero, the trailing edge of the object appears in the foreground video signal on line 18 (waveform A). This edge when inverted by inverter 26, is a positive-going transistion (waveform B) which triggers the second one-shot 28 (waveform E). This produces a pulse at the output of the second one-shot from time 0 to time $T_2$ which is fed to AND gate 30 via OR gate 24.

Because the object's video signal is delayed by the second delay circuit 20 for a period T, the foreground video applied to the other input of AND gate 30 is also high until time T, just prior to $T_2$. Therefore, a high level mode control signal (waveform G) is applied to the mixer 16 which produces an output that is a mixture of the background and foreground images for the interval 0 to T. After time T only the background image is transmitted by the mixer 16.

This mixing of the foreground and background video images at the edges of the foreground objects, produces a blending or feathering of the objects into the background scene. This blending reduces the effects of sharp contrast edges and aliasing, and makes the objects appear to be more realistically a part of a single scene.

As noted above, both the foreground and background video images are delayed by the same amount, typically one-half a pixel period The complexity and cost of the super imposition apparatus 10 may be reduced by eliminating the background delay circuit 12. This causes the two video images to be slightly shifted with respect to each other. However, as long as the delay is relatively short (e.g. one half a pixel period) the shift will be inconsequential and will not produce glitches in the output as a result of mixing two non-synchronized signals.

Figure 3:
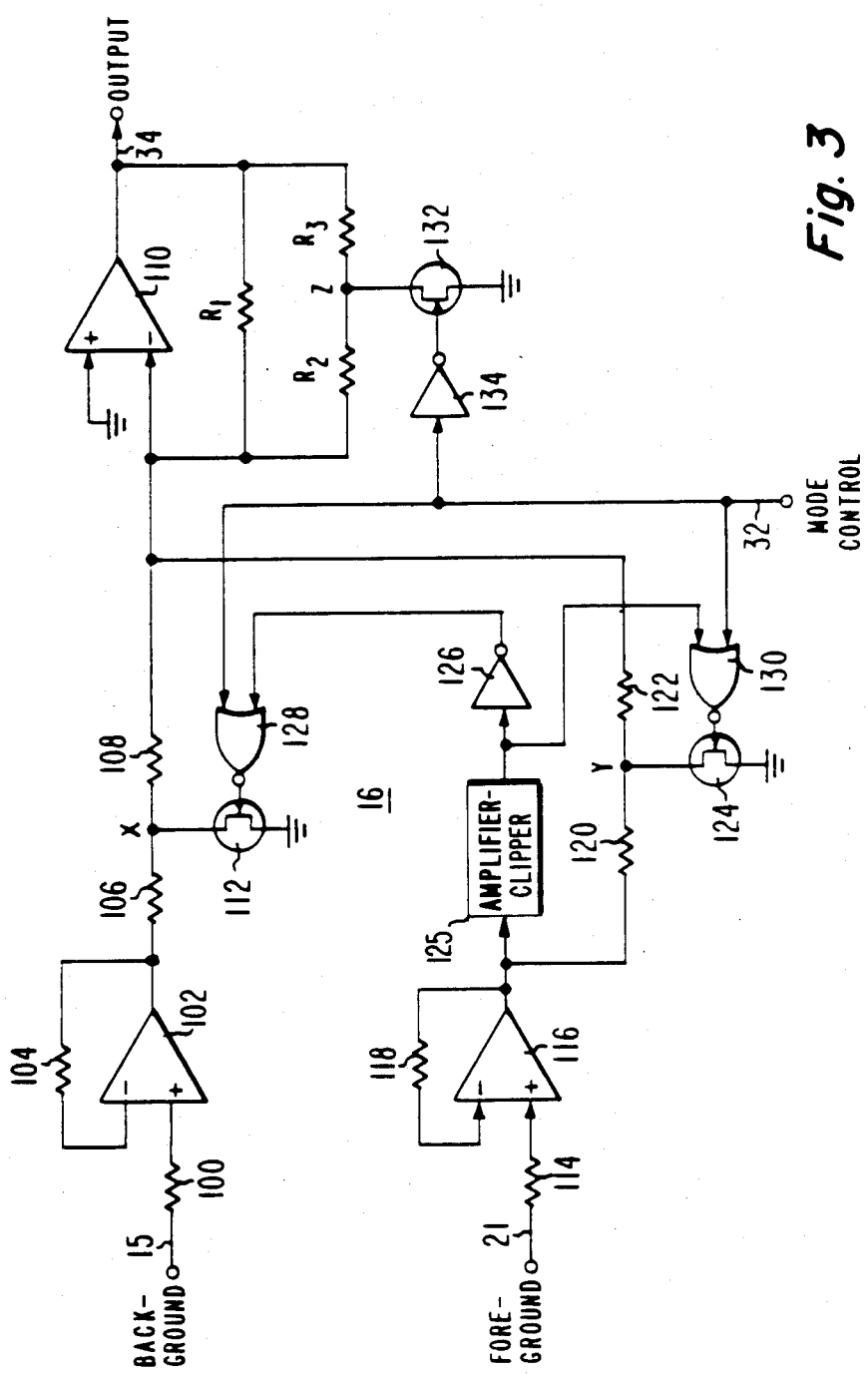
FIG. 3 is a schematic diagram of the mixer in FIG. 1.

As is evident from the above description of the operation of the superimposition apparatus 10, the mixer 16 passes the background video except when an object is present in the foreground video image. When such an object is detected by the circuit 10, the mixer 16 superimposes the object over the background image and blends the two images at the edges of the object. Details of the mixer circuitry for blending the vertical edges of an object are shown in FIG. 3.

The background video from the first delay 12 is supplied to the mixer 16 on line 15 where it is coupled through resistor 100 to the non-inverting input of a first buffer amplifier 102. The output of the first amplifier 102 is connected to its inverting input by feedback resistor 104. Two series connected resistors 106 and 108 couple the first amplifier's output to the inverting input of an output amplifier 110. A first n-channel field effect transistor (FET) 112 connects the node X between the two series connected resistors 106 and 108 to ground via the transistor's source-drain conduction path.

The non-inverting input of the output amplifier 110 may be directly connected to ground as shown or alternatively through an offset bias resistor. A first feedback resistor $R_1$ extends between the output amplifier's inverting input and its output. A pair of series connected feedback resistors $R_2$ and $R_3$ are connected in parallel with the first feedback resistor $R_1$. Each resistor, $R_2$ and $R_3$, is one-half the resistance of $R_1$. The node Z between feedback resistors $R_2$ and $R_3$ is coupled to ground via the source-drain path of a feedback n-channel third FET 132.

The foreground video image signal on line 21 is fed via resistor 114 to the non-inverting input of a second amplifier 116. The output of the second amplifier is coupled to its inverting input by feedback resistor 118. The output from the second amplifier 116 is also connected to the inverting input of the output amplifier 110 via two series connected resistors 120 and 122. The node Y between these series connected resistors 120 and 122 is coupled to ground via the source drain path of a second n-channel FET 124.

The output of the second amplifier 116 is also fed to an amplifier-clipper circuit 125 which converts and conditions the foreground image signal for use in driving digital control circuitry in the mixer 16. The input threshold of this amplifier-clipper is set to less than reference black. The output of the amplifier-clipper 125 is coupled through an inverter 126 to one input of a first NOR gate 128 and is directly coupled to one input a second NOR gate 130. The other inputs of the two NOR gates 128 and 130 are connected to the mode control input 32 of the mixer 16. The output of the first NOR gate 128 is connected to the gate of the first FET 112 and the output of the second NOR gate 130 is connected to the gate of the second FET 124. The mode control input is connected via inverter 134 to the gate of the feedback FET 132.

The operation of the mixer 16 is controlled by the presence or absence of an object in the foreground video image on line 21. Assuming that a foreground object is not present (before time zero in FIG. 2a), a level below reference black will be present at the output of the second amplifier 116 and the clipper 125. Therefore, one input of the second NOR gate 130 will be low (0) and the inverter 126 will produce a high (1) level at the corresponding input of the first NOR gate 128. In the absence of a foreground object, the mode control input from AND gate 30 on line 32 (FIG. 1) will be low. Therefore, when an object is not present, the first NOR gate 128 output is low turning off the first FET 112, and the second NOR gate 130 output is high turning on the second FET 124 which shorts the foreground video signal to ground. In this state only the background image signal reaches the output amplifier 110.

The low level on the mode control input 32, when inverted by inverter 134, turns on the feedback FET 132. When the feedback FET conducts, the resistors $R_2$ and $R_3$ are removed from the feedback path producing an effective feedback resistance equal to only R1.

When a leading edge of a foreground object is present (time zero in FIG. 2a), the edge is detected by the circuit in FIG. 1, as previously described, causing a high level on the mode control input 32. The high mode input when applied to the first and second NOR gates 128 and 130 will turn off both the first and second FET's 112 and 124 respectively, regardless of the signal level at the other input of the NOR gates. This allows both the background and foreground video signals to be applied to the input of the output amplifier 110.

Because the input level to the output amplifier 110 is increased by the application of both video signals, the gain of the amplifier must be reduced to equalize the output level. The high level mode control signal when inverted by inverter 134 turns off the feedback FET 132. As node Z between resistors $R_2$ and $R_3$ is no longer grounded, all three feedback resistors are in the circuit, producing an effective resistance equal to:

$$R_{eff} = \frac{R_1 \times (R_2 + R_3)}{R_1 + (R_2 + R_3)}$$

but $R_1 = R_2 + R_3$ as $R_2$ and $R_3$ are both equal to one-half $R_1$. Therefore, $$R_{eff} = \frac{R_1 \times R_1}{R_1 + R_1} \text{ or } \tfrac{1}{2}R_1$$

Thus, the turning off of FET 132 lowers the effective resistance increasing the negative feedback and decreasing the output amplifier's gain by one half.

Once time T+T1 (FIG. 2a) has been reached the mode control input returns to the low level. However, since the foreground object is still present, the output from clipper 125 is high. This high level applied to the second NOR gate 130 keeps the second FET 124 turned off and since inverter 126 applies a low level to the first NOR gate 128, the first FET 112 is turned on shorting the background signal to ground. Therefore, in this state only the foreground image signal is applied to the output amplifier 110. The low mode control level applied through inverter 134 to FET 132 also returns the feedback resistance of the output amplifier 110 to the $R_1$ level as explained above with respect to the state before time zero.

When the trailing edge of the object is detected, a mixing of the foreground and background signals again takes place as it did for the leading edge. Once the mixing time T (FIG. 2b) has elapsed, the mixer 16 returns to the first state described above in which only the background video image flows to the mixer output 34.

The mixer circuit of FIG. 3 provides a blending of only the vertical edges of the foreground objects. Additional circuitry could be provided to blend the horizontal edges by delaying the signal by a full horizontal line time and producing a mixing of signals upon detection of a horizontal edge.

In the above description, mixer 16 provided a three state output, background video only, foreground video only, or an equal mixture of foreground and background video signals. Alternatively instead of a single fixed blend of the two video signals at the object edges, the mixer 16 could provide a cross-fade from one video to the other. For example, upon detection of the leading edge of the object, the background video is faded out over several pixels while at the same time the foreground video is faded in. Apparatus for producing such a cross-fade is well known in television production equipment particularly video switching equipment. Up and down ramp signal generators may be provided to control the respective magnitudes of the foreground and background video signals in the mixer 16. This cross-fade embodiment provides a feathering of the object into the background scene.

We claim:

1. Video signal processing apparatus comprising:

means for detecting the edges of an object in a first video signal, wherein said detecting means comprises:

(a) a means for delaying the first video signal;
(b) a first monostable multivibrator for producing an output pulse when the output from the delaying means reaches a given threshold;
(c) an inverter having the first video signal applied to its input;
(d) a second monostable multivibrator for producing an output pulse when the output of the inverter reaches a given threshold;
(e) an OR gate having an input connected to the output of the first monostable multivibrator and another input connected to the output of the second monostable multivibrator;
(f) an AND gate having one input to which the output of the OR gate couples and having another input to which the output of the first video signal delaying means couples; and
(g) means for inserting said object in the first video signal into an image in a second video signal to produce a composite output signal, including means for mixing the two video signals for a period of time upon the detection of at least one edge of the object to produce said composite output signal during said period of time said mixing means having a first video input to which the output of the first video signal delaying means couples, having a second video input receptive of the second video signal and having a control input coupled to the output of the AND gate.

2. The apparatus as in claim 1 further comprising a means for delaying the second video signal and coupling the delayed second video signal as an input to said mixing means.

3. The apparatus as in claim 2 wherein the two delaying means delay the respective signals for substantially the same amount of time.

4. The apparatus in claim 1 wherein the inserting means comprises:
an inverter for providing an inverted representation of said first video signal;
a first NOR gate having one input coupled to the edge detecting means and another input coupled to the output of the inverter;
a first switch means for controlling the transmission of the second video signal, said first switch means being responsive to the output of the first NOR gate;
a second NOR gate having one input coupled to the edge detecting means and another input to which said representation of said first video signal is coupled; and
a second switch means for controlling the transmission of the first video signal, said second switch means being responsive to the output of the first NOR gate.

5. The apparatus as in claim 4 wherein the inserting means further includes an output amplifier coupled to the first and second switch means and having means for controlling the amplifier gain which is responsive to the edge detecting means.

6. The apparatus as in claim 4 wherein the first and second switch means comprise field effect transistors.

7. The apparatus as in claim 1 wherein the means for mixing includes means for cross-fading the two video signals.

8. Apparatus for processing a first video signal containing an object to be inserted in a second video signal representing an image, said apparatus comprising:
first and second terminals to which the first and second video signals are respectively applied;
first means for delaying a video signal having an input terminal connected to the first terminal and having an output terminal at which delayed first video signal is supplied in response to first video signal at said first terminal;
means, responsive to the luminance values of the delayed first video signal at the output terminal of said first delay means, for detecting leading edges of said subject and producing an output signal for a first given period upon the detection of a leading edge;
means, responsive to the luminance values of the undelayed first video signal at the first terminal, for detecting trailing edge of said object and producing an output signal for a second given period upon the detection of a trailing edge; and
means, coupled to said first and second terminals, for inserting the object in said first video signal into the image of said second video signal, and including means responsive to the output signals from said means for detecting leading edges and from said means for detecting trailing edges, for mixing first video signals representing said object with said second video signal only during said first and second given periods of said output signals to produce a composite video signal, and wherein for an object having an interval between its leading and trailing edges exceeding the sum of said first and second given periods, the first and second video signals are not mixed over a portion of said object.

9. The apparatus as in claim 8 further comprising a second delay circuit for delaying said second video signal as appears at said second terminal, for application to the second input of said inserting means.

10. Apparatus for processing a first video signal containing an object to be inserted in a second video signal representing an image, said apparatus comprising:
first and second terminals to which the first and second video signals are respectively applied;
first means for delaying a video signal having an input terminal connected to the first terminal and having an output terminal at which delayed first video signal is supplied in response to first video signal at said first terminal;
means, responsive to the luminance values of the delayed first video signal at the output terminal of said first delay means, for detecting leading edges of said object and producing an output signal for a first given period upon the detection of a leading edge;
means, responsive to the luminance values of the undelayed first video signal at the first terminal, for detecting trailing edges of said object and producing an output signal from a second given period upon the detection of a trailing edge;
a first gate having one input receptive of the output signal from the leading edge detecting means and another input receptive of output signal from the trailing edge detecting means, said first gate producing an output signal indicating when either detecting means is producing an output signal in response to detecting an edge;

a second gate having one input to which the output of the first delay means couples and having another input to which the output of said first gate couples, said second gate producing an output signal indicating when both an object is present in the output of said first delay means and the first gate is producing an edge indicating output signal; and a video mixer having one video input terminal, to which said second video signal is applied, another video input terminal connected to the output terminal of said first delay means, a video output terminal and a control input terminal to which the output of said second gate is coupled, said video mixer inserting said object in said delayed first video signal into said image of said second video signal to produce a composite output signal at said video output terminal.

11. The apparatus as in claim 10 wherein a second delay means delays the second video signal as appears at said second terminal, for application to said one video input terminal of said video mixer.

* * * * *